(12) United States Patent
Milliff et al.

(10) Patent No.: US 6,682,323 B2
(45) Date of Patent: Jan. 27, 2004

(54) SIMPLIFIED STAMPED COUNTERWEIGHT

(75) Inventors: Tracy L. Milliff, Bristol, VA (US); John R. Williams, Bristol, VA (US)

(73) Assignee: Scroll Technologies, Arkadelphia, AK (US)

( * ) Notice: Subject to any disclaimer, the term of this patent is extended or adjusted under 35 U.S.C. 154(b) by 36 days.

(21) Appl. No.: 10/153,027

(22) Filed: May 21, 2002

(65) Prior Publication Data

US 2003/0219349 A1 Nov. 27, 2003

(51) Int. Cl.$^7$ .............................. F04B 17/00; H02K 5/24
(52) U.S. Cl. ........................ 417/410.5; 418/151; 310/51
(58) Field of Search ...................... 417/410.5; 418/55.1, 418/151

(56) References Cited

U.S. PATENT DOCUMENTS

| | | | | |
|---|---|---|---|---|
| 4,271,368 A | * | 6/1981 | Burns | 310/42 |
| 4,388,756 A | * | 6/1983 | Burns | 29/598 |
| 4,915,554 A | * | 4/1990 | Serizawa et al. | 418/94 |
| 5,312,229 A | * | 5/1994 | Sano et al. | 418/55.1 |
| 5,314,316 A | * | 5/1994 | Shibamoto et al. | 418/55.1 |
| 5,336,060 A | * | 8/1994 | Tomell et al. | 417/410.5 |
| 5,395,224 A | * | 3/1995 | Caillat et al. | 418/55.6 |
| 5,597,293 A | * | 1/1997 | Bushnell et al. | 417/410.3 |
| 5,951,271 A | * | 9/1999 | DuMoulin et al. | 418/55.3 |
| 6,247,907 B1 | * | 6/2001 | Williams et al. | 417/410.5 |
| 6,291,920 B1 | * | 9/2001 | Miller et al. | 310/261 |

* cited by examiner

Primary Examiner—Charles G. Freay
(74) Attorney, Agent, or Firm—Carlson, Gaskey & Olds

(57) ABSTRACT

A simple, stamped counterweight is formed from a flat sheet of metal. The counterweight is attached to an uppermost portion of the end ring of the motor rotor. In this way, the counterweight requires little axial space, and is a very simple item to produce and assemble.

12 Claims, 3 Drawing Sheets

SIMPLIFIED STAMPED COUNTERWEIGHT

BACKGROUND OF THE INVENTION

This invention relates to a simple counterweight construction for a sealed compressor.

Sealed compressors are utilized in most refrigerant compression applications. One well known type of sealed compressor is a scroll compressor. In a scroll compressor, first and second scroll elements are each formed with a base and a generally spiral wrap extending from the base. The wraps interfit to define compression chambers. One of the two scroll members is caused to orbit relative to the other.

Scroll compressors are formed to have a counterweight associated with their drive shaft. The counterweight is positioned to account for weight imbalance during operation of the scroll compressor.

Historically, counterweights were relatively large items. As an example, FIG. 1 shows a prior art sealed compressor 20. The compressor incorporates a non-orbiting scroll member 22 and orbiting scroll 24. The scroll members each include wraps 25, which interfit to define compression chambers. An electric motor 30 includes a stator 32 and a rotor 34. As known, the stator has windings 36 at each axial end. The rotor 34 has an end ring 38 at each end. As can be appreciated in FIG. 1, the upper end ring stops at a vertical position beneath the vertically uppermost portion of the windings 36. A relatively massive counterweight 40 is shown in FIG. 1. The counterweight 40 requires a good deal of space.

More recently, the assignee of the present application has developed a thin, stamped counterweight. This counterweight is shown for example in U.S. Pat. No. 6,247,907. While the counterweight of this patent is successful, and requires less axial space than the prior art of FIG. 1, it would still be desirable to further simplify the counterweight.

SUMMARY OF THE INVENTION

The instant application includes a thin counterweight which is formed from a relatively flat sheet. The relatively flat sheet is a very simple part to manufacture, and will require little axial space when assembled. In another aspect of this invention, the counterweight is attached to the upper end ring of the rotor. Preferably, the end ring extending vertically upwardly beyond the vertically uppermost part of the stator windings.

The present invention thus provides a unique counterweight which is simpler to manufacture than the prior art, and which requires little axial space.

These and other features of the present invention can be best understood from the following specification and drawings, the following of which is a brief description.

DETAILED DESCRIPTION OF A PREFERRED EMBODIMENT

Figure 1:
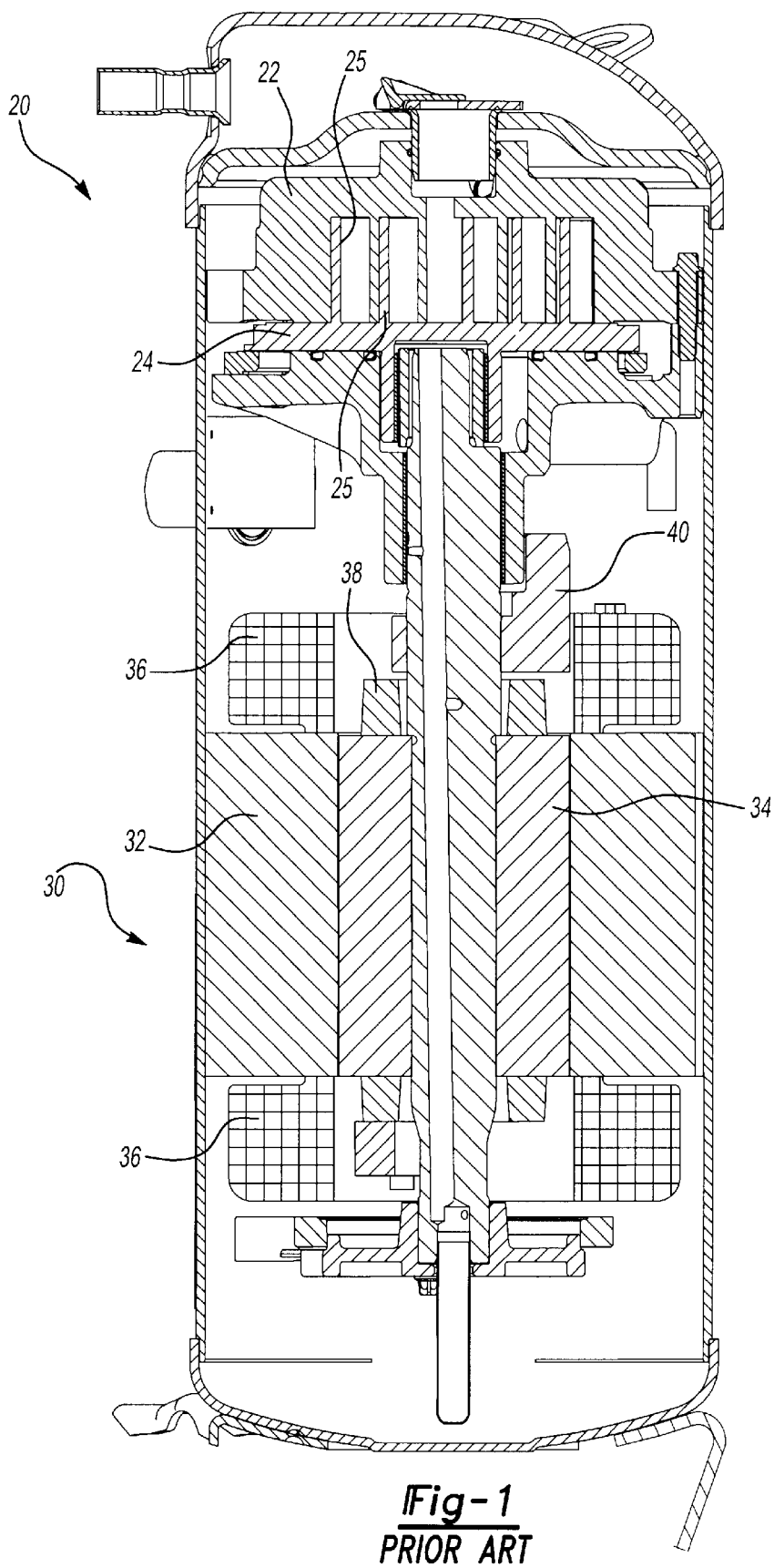
FIG. 1 shows a prior art scroll compressor.
Figure 2:
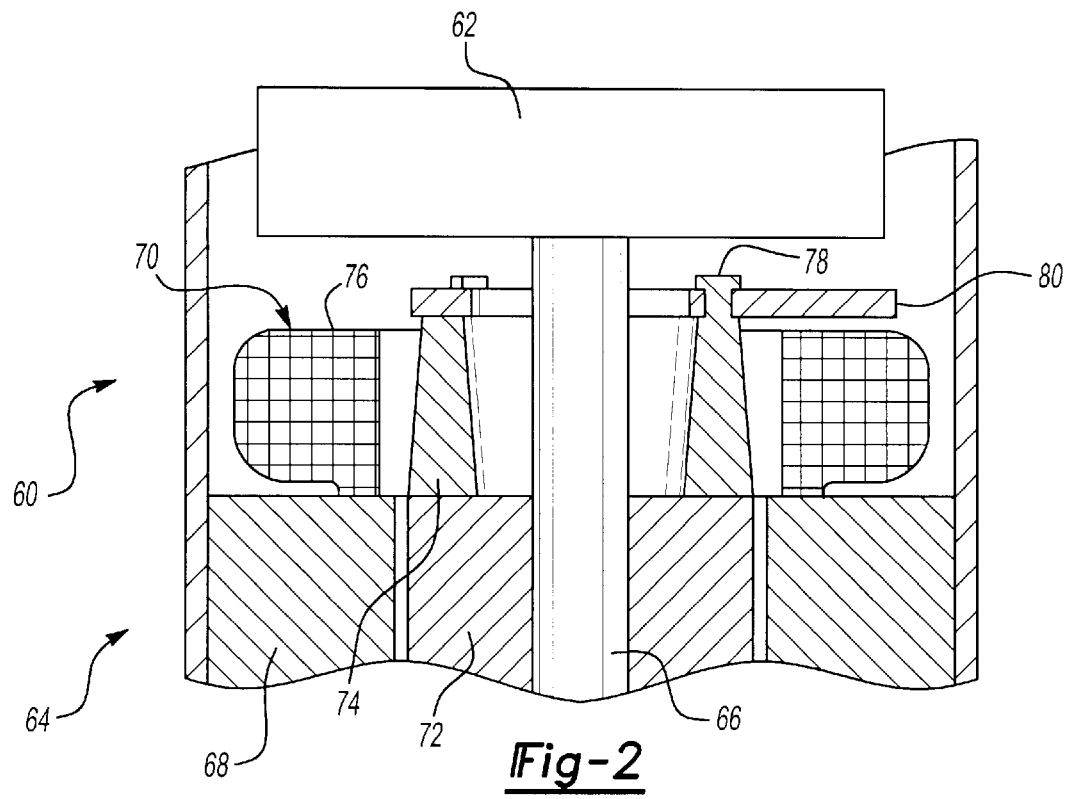
FIG. 2 is a cross-section of the inventive counterweight.

A compressor 60 is illustrated in FIG. 2 having a scroll set 62, shown schematically. An electric motor 64 drives a shaft 66. The motor includes a stator 68 having windings 70 and a rotor 72 having an end ring 74. As can be seen, the vertically uppermost part 76 of the windings is vertically below the uppermost part 78 of the end ring. A simple, flat counterweight 80 is attached to the end ring 74. As can be seen, the counterweight is thus vertically above the windings 70 such that it can rotate with the shaft 66.

Figure 3:
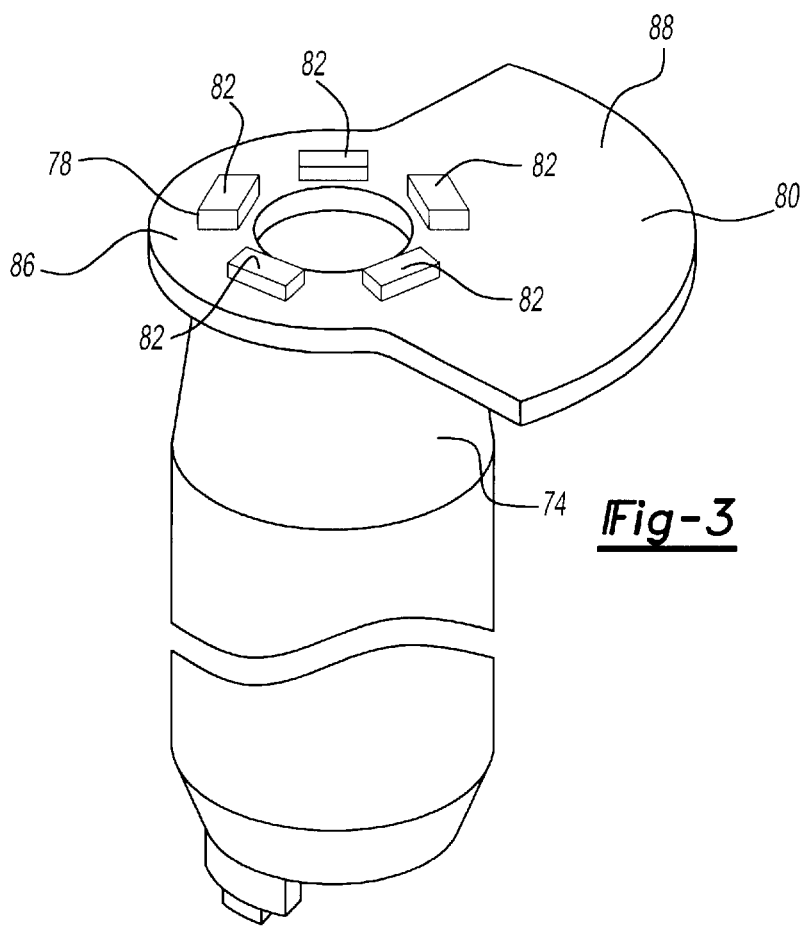
FIG. 3 is a perspective view showing the inventive counterweight mounted to a rotor.

As can be seen in FIG. 3, a series of stake pins 82 provide the vertically uppermost portions 78, and also serve to hold the counterweight 80 on the end ring 74. As can be appreciated, the counterweight 80 has a circular portion 86 with a circumferentially extending section 88 which provides the counterweight function. As can be appreciated, since the counterweight is flat, the uppermost surface of the counterweight 80 is actually vertically below the uppermost portion 78, of the end ring 74. Preferably, the entire surface of the counterweight is at most vertically equal to the vertically uppermost surface of the end ring 74 due to the flat shape of the counterweight 80. Alternatively, the stakes could be flush.

The counterweight 80 may be stamped as a simple item, and then attached to the end ring. Although pins 82 are illustrated, the counterweight can be attached to the end ring in any other known fashion. As examples, the counterweight could be attached by screws, or formed to the end ring when the end ring is cast.

Figure 4:
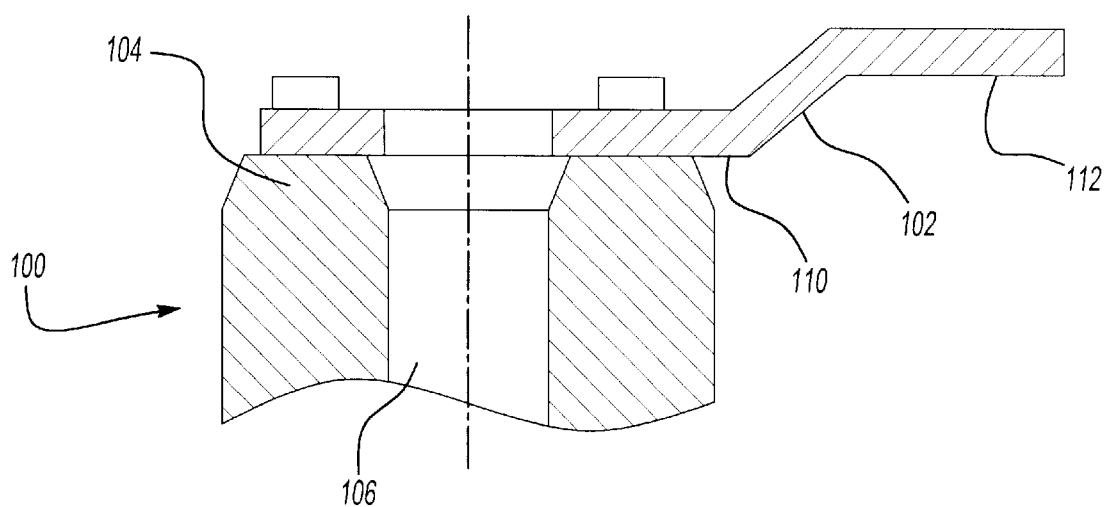
FIG. 4 shows yet another embodiment.

As shown in FIG. 4, an alternative embodiment 100 includes a counterweight 102 attached to an end ring 104 on the rotor 106. The attachment may be similar to the FIG. 3 embodiment. However, while this counterweight is thin as in the prior embodiment, it is not flat. Instead, a first portion 110 extends vertically at an angle to an outer ridge 112.

Although a preferred embodiment of this invention has been disclosed, a worker of ordinary skill in this art would recognize the modifications would come within the scope of this invention. For that reason the following claims should be studied to determine the true scope and content of this invention.

What is claimed is:

1. A sealed compressor comprising:

a compressor pump unit;

an electric motor for driving said compressor pump unit, said electric motor including a stator with a rotor;

said rotor being attached to drive a shaft, said shaft being operatively connected to drive said compressor pump unit; and a counterweight attached to an end ring on said rotor, said counterweight being formed as a generally thin item, said counterweight attached to an upper end of said end ring on said rotor, and said counterweight surrounding said shaft.

2. A sealed compressor as recited in claim 1, wherein said compressor pump unit is a scroll compressor pump.

3. A sealed compressor as recited in claim 1, wherein said counterweight is stamped from metal.

4. A sealed compressor as recited in claim 1, wherein said counterweight is flat.

5. A sealed scroll compressor as recited in claim 4, wherein a vertically uppermost end of said counterweight is vertically equal to or below said vertically uppermost portion of said end ring.

6. A sealed compressor comprising:

a compressor pump unit;

an electric motor for driving said compressor pump unit, said electric motor including a stator with a rotor;

said rotor being attached to drive a shaft, said shaft being operatively connected to drive said compressor pump unit;

a counterweight attached to a vertically uppermost portion of an end ring on said rotor, said counterweight being formed as a generally thin item; and said stator has windings extending vertically upwardly, and said end ring extends vertically upwardly for a greater distance than said windings.

7. A sealed compressor as recited in claim 6, wherein a vertically uppermost end of said counterweight is vertically equal to or below said vertically uppermost portion of said end ring.

8. A sealed compressor comprising:

a compressor pump unit;

an electric motor for driving said compressor pump unit, said electric motor including a stator with a rotor;

said rotor being attached to drive a shaft, said shaft being operatively connected to drive said compressor pump unit;

a counterweight attached to an end ring on said rotor, said counterweight being formed as a generally thin item; and said counterweight is provided with a plurality of planar sections, with a first section attached to said end ring, an angled section extending from said first section and an outer section extending from said angled section.

9. A sealed compressor as recited in claim 8, wherein said counterweight is attached to a vertically uppermost portion of said end ring.

10. A sealed scroll compressor comprising:

a scroll compressor pump unit;

an electric motor for driving said scroll compressor pump unit, said electric motor including a stator with a rotor;

said rotor being attached to drive a shaft, said shaft being operatively connected to drive said scroll compressor pump unit; and a counterweight attached to an end ring on said rotor, said counterweight attached to an upper end of said end ring, with said stator having windings extending vertically upwardly, and said end ring extending vertically upwardly for a greater distance than said windings.

11. A sealed compressor as recited in claim 10, wherein said counterweight is flat.

12. A sealed compressor as recited in claim 10, wherein said counterweight is provided with a plurality of planar sections, with a first section attached to said end ring, an angled section extending from said first section and an outer section extending from said angled section.

* * * * *

UNITED STATES PATENT AND TRADEMARK OFFICE
CERTIFICATE OF CORRECTION

PATENT NO. : 6,682,323 B2
DATED : January 27, 2004
INVENTOR(S) : Milliff et al.

It is certified that error appears in the above-identified patent and that said Letters Patent is hereby corrected as shown below:

Title page,
Item [73], Assignee, change the state abbreviation to read as -- AR --

Signed and Sealed this

Thirtieth Day of March, 2004

JON W. DUDAS
*Acting Director of the United States Patent and Trademark Office*